(No Model.)
P. F. KRUG.
LUBRICATOR.
No. 490,910.  Patented Jan. 31, 1893.
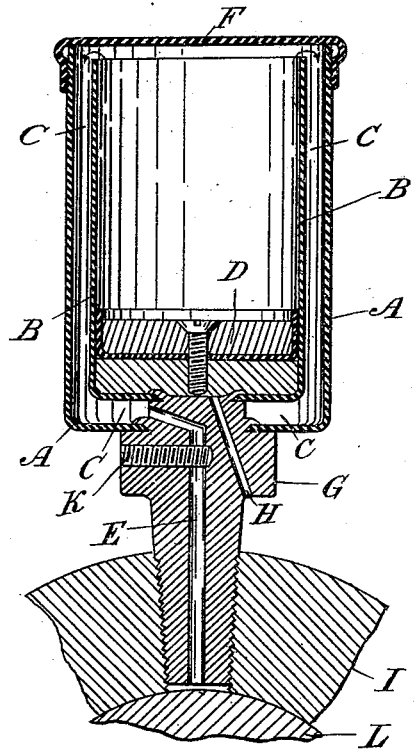
WITNESSES:
Chas. L. Horack
George Krug
INVENTOR
Philip Fredrich Krug.

UNITED STATES PATENT OFFICE.

PHILIP FREDRICK KRUG, OF BROOKLYN, NEW YORK.

LUBRICATOR.

SPECIFICATION forming part of Letters Patent No. 490,910, dated January 31, 1893.

Application filed April 6, 1891. Serial No. 387,731. (No model.)

*To all whom it may concern:*

Be it known that I, PHILIP FREDRICK KRUG, a citizen of the United States, and a resident of Brooklyn, in the county of Kings and State of New York, have invented certain new and useful Improvements in Lubricators, of which the following is a specification.

My invention refers to means for lubricating automatically the bearing surfaces on loose pulleys, wheels, collars and all gearing running loose on shafts, shanks, pins &c, particularly where such lubrication is to be performed continuously while the appliances to be lubricated are in rotative motion.

The purposes of my invention are to provide simple and effective means for utilizing the centrifugal force produced by revolving machinery in gradually and automatically moving and directing lubricating oil or other liquid toward the bearing surfaces to be lubricated, to perform such lubrication no matter whether the revolving motion takes place in a vertical or any other plane, and to limit the lubrication to the time while revolving motion is taking place. The means employed by me in accomplishing these and other useful purposes are described hereinafter and more fully set forth in the claim.

The accompanying drawing, forming part of this specification represents a vertical section of a lubricator constructed according to my invention.

A and B are metallic shells both shown to be arranged and constructed as inverted cylindrical caps, shell A being made of greater depth and of greater diameter than shell B so as to be capable of entirely surrounding said shell B and extending above it as well as below the same as shown. Both of said shells are mounted solidly on a nipple G, so as to leave between them a space C extending from the upper part of the outer surface of such nipple laterally and upward.

F is a cap attached by screw-thread arrangement to the upper end of the outer shell A so as to insure a tight joint between the same while the lubricator is in operation, while permitting of detaching it when desired, which becomes necessary when the lubricator is to be recharged with oil or other liquid lubricating substance, as more fully mentioned hereinafter.

D is a piston fitted within cylinder B and packed with a cup washer or other packing adapted to secure a tight fit between piston and cylinder while minimizing the friction resulting therefrom.

E is a passage extending through nipple G from the lower extremity of such nipple to that part of its upper surface from which space C extends laterally. The part of nipple G directly underneath the shell A is preferably made in the form of a hexagon, so as to be able to take hold of it there with a wrench while placing the device in its proper operative position. While passage E is represented in the figure as extending along the axis of the nipple for nearly its entire length, branching off laterally toward space C near its upper extremity, any other form and direction might be given to such passage so as to provide a normally unobstructed channel for the liquid lubricating medium.

K is a regulating screw inserted in nipple G so as to reach and intersect passage E. Said screw is shown here to have a diameter greater than the diameter of passage E and it will therefore be seen that provision being made to carry the inner end of the screw across and somewhat beyond passage E such passage can thus either be closed entirely or its effective area may at that point be reduced to any desired extent simply by properly adjusting the position of said screw.

H is an air passage extending through nipple G so as to bring the underside of piston D in communication with the atmosphere.

I represents the part of a hub of a pulley wheel, gearing or other similar revolving appliance to which my lubricator is attached by means of the screw-thread at the taper end of the nipple and L the axis around which such revolving takes place.

The operation of my lubricator is as follows: When the same is to be charged with oil or other suitable liquid lubricating substance, the cap F is detached therefrom, piston D placed in the depressed position shown in the figure and the interior of cup or shell B above piston D is filled with oil. After this cap F is again screwed to the upper edge of shell A and the whole apparatus having remained attached to, or being thereupon attached to hub I, as soon as such hub and with it the lubricator begins to revolve, the centrifugal force produced by such rotation will be applied to the device, and the piston D and the oil contained within the lubricator being the only parts and substances capable of moving under the influence of such centrifugal force will assume an outward motion toward cap F, air simultaneously entering through passage H into the part of the interior of shell B which is being vacated by said piston, thus preventing the formation of a partial vacuum underneath such piston, which vacuum together with the friction between the piston and the walls of shell B would soon defeat further outward motion of the piston. The oil being pushed forward and outward by the piston as it strikes cap F will be deflected into the annular space between shells A and B and will be forced to travel between said two shells until it reaches passage E and through the same the bearing surfaces to be lubricated and this operation will continue during the progress of the revolving motion and until the piston has reached a position at the extreme outer end of shell B when it will be time to again replenish the appliance with oil as mentioned above.

I am aware that it has been proposed heretofore to employ centrifugal force in propelling a piston of a lubricating device outward, for the purpose of thereby conducting the lubricating oil through proper passages toward the surfaces which are to be lubricated, and I am also aware that a lubricator has been devised on this principle, consisting of a cylindrical oil cup surrounding a tube which conveys the oil to the surfaces to be lubricated, a piston within said oil cup but surrounding such tube being forced outward by centrifugal force and the oil being thus directed toward aforesaid surfaces.—However none of said devices are fully satisfactory, owing to the following difficulties in their mode of operating:

In order to prevent escape of lubricating oil from the oil cup a close fit is required between the piston and the adjoining surfaces, and as the oil in the cup is apt to become gummy there is danger of the piston sticking to the cup, particularly in the last described device, where the piston is made to slide along the surfaces of the outer as well as the inner cylinder.—Such oil is also apt to congeal in and obstruct the small passages generally employed for conducting the oil inwardly toward the axle which is to be lubricated, and it then becomes necessary to heat the device, so as to again insure free movement of the piston and free flow of the oil in the passages of the lubricator.—By the use of two cylinders as employed by me with the inward passage for the oil made of an annular cross-section and provided between said two cylinders, I can count on it that at least part of such annular passage remains open at all times, but if heating of the lubricator should become necessary, the heat so applied will very readily penetrate through both said cylinders as they may be made of spun brass and may consequently be made very thin.—It will also be seen that the construction of my lubricator is very simple and consequently very cheap, but very little fitting being required in making the same.—If for any reason it should become desirable to interrupt the lubricating operation of the device, it is only necessary to turn screw K sufficiently, so as to close by it the channel E. If the discharge from the lubricator under the influence of the speed with which it is revolving should be either too copious or too restricted a proper adjustment of the position of screw K with reference to passage E so as to reduce or increase the effective opening therein will serve to regulate the flow of the lubricant as may be desired, screw K here simply performing the functions of a stop-cock.

I claim as new and desire to secure by Letters-Patent—

In a lubricator for loose pulleys &c. the inner oil cup B containing piston D adapted to be forced outward by centrifugal force, shell A surrounding cup B, so as to form space C communicating with the interior of cup B, and attached to nipple G containing oil passage E, and an air passage leading to the underside of the piston, substantially as set forth.

Signed at New York, in the county of New York and State of New York, this 2d day of April, A. D. 1891.

PHILIP FREDRICK KRUG.

Witnesses:
GEORGE KRUG,
HUGO KOELKER.